Dec. 4, 1956 W. B. GUGGI 2,773,200
DIRECT CURRENT TRANSFORMATION DEVICE
Filed Oct. 22, 1954 3 Sheets-Sheet 1

WITNESSES
Edwin E. Bassler
John B. Davidson

INVENTOR
Walter B. Guggi
BY
Paul E. Friedemann
ATTORNEY

Dec. 4, 1956  W. B. GUGGI  2,773,200
DIRECT CURRENT TRANSFORMATION DEVICE
Filed Oct. 22, 1954  3 Sheets-Sheet 3

United States Patent Office 2,773,200
Patented Dec. 4, 1956

2,773,200

DIRECT CURRENT TRANSFORMATION DEVICE

Walter B. Guggi, Snyder, N. Y., assignor to Westinghouse Electric Corporation, East Pittsburgh, Pa., a corporation of Pennsylvania Application October 22, 1954, Serial No. 463,936

5 Claims. (Cl. 307—110)

My invention relates generally to voltage and current transforming devices and, more particularly, to devices for transforming direct voltage and current.

In many industrial applications there exists a need for changing the magnitude of a direct current voltage with minimum power loss. For example, in aircraft installations it is generally necessary to step up the 28 volt direct current output of generators usually installed therein to an operating voltage which may be of the order of several hundred volts. The usual practice is to use a D. C.-to-D. C. motor generator set, or a rather cumbersome apparatus involving a "chopper" or D. C.-to-A. C. converter coupled to a transformer or A. C. amplifier, and a rectifier coupled to the output thereof to provide a direct current output. These devices are quite expensive, bulky and are usually very heavy, all of which limitations are of considerable importance particularly in aircraft installations. Additionally, the relatively low efficiency of the devices generally tends to make their use undesirable.

One object of my invention is to provide apparatus for the transformation of the magnitude of a direct voltage or current.

Another object is to provide apparatus for changing the magnitude of a direct voltage or current with relatively high efficiency.

Still another object is to provide a simple, straightforward apparatus for changing the magnitude of direct voltage and current.

Yet another object is to provide a matching device for use between stages, or between a stage and output load, in D. C. amplifiers.

To achieve the objects noted above, and other objects which will become apparent from the description of my invention which follows, I utilize a plurality of capacitors which are adapted to be alternately connected in series and in parallel. When it is desired to increase the magnitude of an input voltage, the capacitors are coupled to the D. C. source while in the parallel connection and discharged to a load while in the series connection. Likewise, to provide an output voltage that has a magnitude less than that of the input voltage of the source, the capacitors are charged by the source while in the series connection and discharged to the load while in parallel.

According to the teachings of my invention, the capacitors are connected in series by means of half-wave rectifiers and are both connected to the D. C. source and also connected in parallel by means of transistor switches. The switches utilize junction transistors, the emitter-to-collector current conduction path of which completes the switch circuit. The switching action is controlled by means of a reversible polarity control voltage imposed between the base electrode and one of the adjoining electrodes thereof. Reference is made to application Serial No. 420,904 of R. L. Bright and G. H. Royer for Transistor Power Control Circuits, filed April 5, 1954, for a more complete description of this type of transistor switch. The extremely fast switching action made possible by means of such switches, which is accomplished with very little power loss not readily obtainable with mechanical devices or vacuum tubes at the repetition rates possible therewith (10 kc. being a typical repetition rate) enables a simple filtering circuit to be used at the output of my invention to decrease or virtually eliminate the ripple voltage produced by the switching action.

My invention will be better understood by referring to the following detailed description thereof when taken in connection with the accompanying drawings, wherein.

Figure 1:
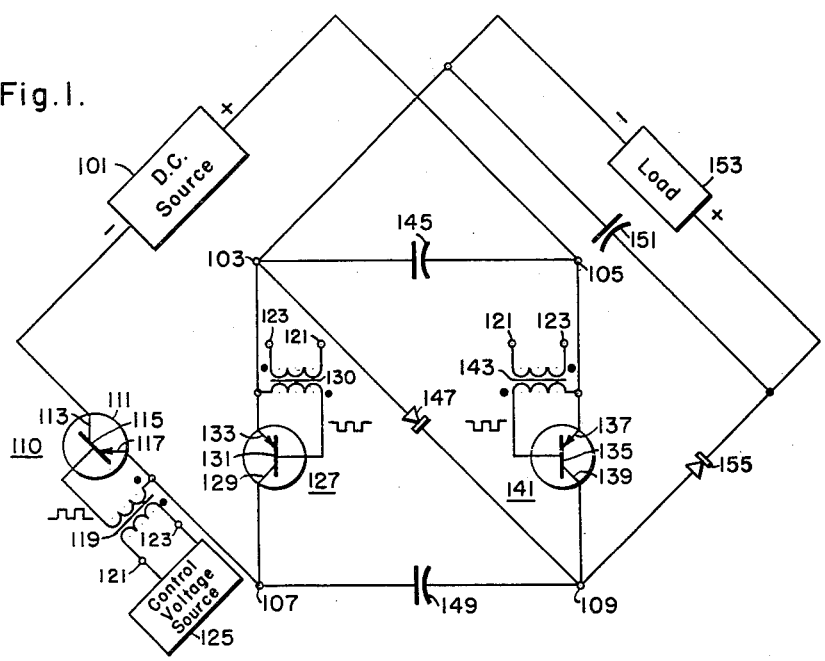
Figure 1 is a diagrammatic showing of one embodiment of my invention suitable for use when it is desired to decrease the magnitude of an input voltage.

In Fig. 1, there is shown a source of direct current 101, the output voltage of which is to be transformed to a different magnitude. A pair of equal capacitance electrical capacitors 145 and 149, connected in series by means of half-wave rectifier 147, are connected across the terminals of source 101 by means of a junction transistor 111 having a base electrode 115, an emitter electrode 117 and a collector electrode 113. The collector electrode 113 is connected to the negative terminal of source 101 and the emitter electrode 117 is connected to terminal 107 of capacitor 149.

A control voltage source 125 is provided having output terminals 121 and 123. Preferably, this control voltage source has a square wave output and may be a device such as is illustrated in Fig. 171 of "Radar Electronic Fundamentals," U. S. Navy Publication Navships No. 900,016 (1944). The voltage appearing across terminals 121 and 123 is connected between the base electrode 115 and the emitter electrode 117 by means of transformer 119.

To provide means for connecting capacitors 145 and 149 in parallel, a pair of transistor switches 127 and 141 are provided. Terminal 103 of capacitor 145 is connected to terminal 107 of capacitor 149 by means of switch 127, the emitter 133 and collector 129 of which are respectively connected to terminals 103 and 107 of capacitors 145 and 149. Likewise, the emitter 137 and collector 139 of transistor switch 141 are respectively connected to terminal 105 of capacitor 145 and terminal 109 of capacitor 149. Terminal 105 is further connected to the positive output terminal of D. C. source 101. Half-wave rectifier 147 which connects terminals 103 and 109 is poled so as to permit current flow from terminal 103 to terminal 109.

The output terminals 121 and 123 of control voltage source 125 are connected to the base and emitter electrodes of transistor switches 127 and 141 by means of transformers 130 and 143, respectively. (Alternatively, a single transformer with multiple secondary windings may be used.) As indicated in the drawing, the secondary windings of the various coupling transformers connected to control source 125 are connected between the base and emitter electrodes of the various transistor switches so that the base 115 of switch 110 is positive when the bases 131 and 135 of switches 127 and 141 are negative. Effectively, this means that switch 110 is in the off position when switches 127 and 141 are in the on position, and vice versa.

Connected across terminals 103 and 109 of capacitors 145 and 149, respectively, by means of half-wave rectifier 155, is a load 153 and a filter capacitor 151. Rectifier 155 is poled so as to permit current flow from terminal 109 to load 153 and capacitor 151.

In operation, on one half-cycle of control voltage source 125, switch 110 will connect the negative terminal of source 101 to capacitor terminal 149. Switches 127 and 141 will be open so that the capacitors are effectively connected in series across D. C. source 101 through rectifier 147. The capacitors 145 and 149 will thus be charged to substantially the output voltage of source 101. On the next half-cycle of control voltage source 125, switch 110 will be open and switches 127 and 141 will be closed, thus disconnecting the capacitors from source 101 and simultaneously connecting them in parallel through switches 127 and 141. Switches 127 and 141 likewise connect the capacitors across the load and, since terminals 105 and 109 are positive with respect to terminals 103 and 107, the capacitors are partially discharged through rectifier 155 and the load. As has been indicated, the switching action may be at an extremely rapid rate so that the capacitor 151 can readily eliminate variations in the voltage across the load produced by the switching action described above.

Figure 2:
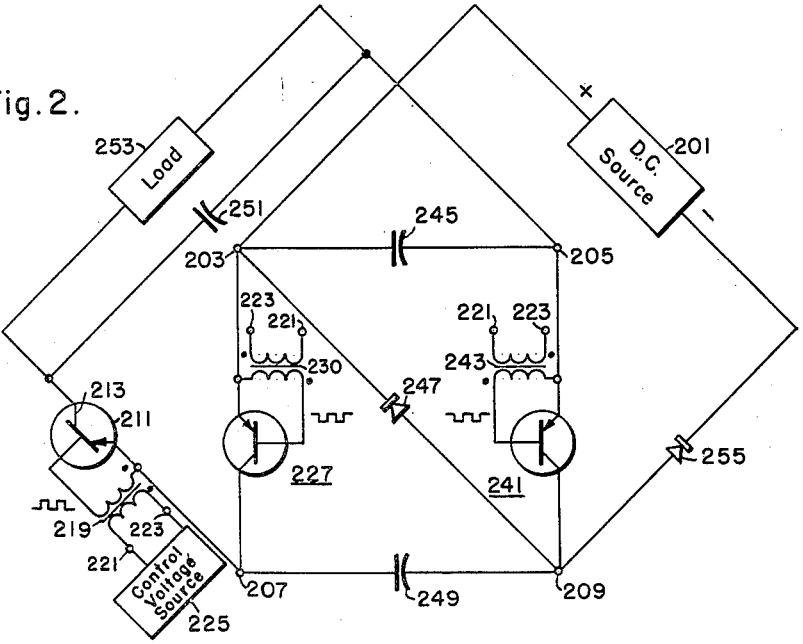
Fig. 2 is a diagrammatic showing of another embodiment of my invention differing from that shown in Fig. 1 in that a voltage step-up is achieved rather than the voltage step-down obtained with the embodiment of Fig. 1.

In the embodiment shown in Fig. 2, reference numerals wherein the last two digits are the same designate identical component parts. This embodiment is essentially similar to that of Fig. 1, the differences being that rectifier 247 connecting terminals 209 and 203 is poled so as to permit current flow from terminal 209 to terminal 203. Additionally, D. C. source 201 is interchanged with load 253 and capacitor 251 so that source 201 is coupled to terminals 203 and 209 by rectifier 255 and the parallel connected load 253 and capacitor 251 are directly connected to terminal 205 and to terminal 207 by means of transistor switch 211. In operation, source 201 charges capacitors 245 and 249 in parallel on the half-cycle of control voltage source 225 whereon switches 227 and 241 are closed and switch 211 is open. The capacitors are discharged through the load on following half-cycles whereon switch 211 is closed and switches 227 and 241 are open. Since the capacitors are in the series connection through rectifier 247 while being discharged, terminals 205 and 209 being positive with respect to terminals 203 and 207, the output voltage presented to the load is substantially twice the voltage of source 201.

Figure 3:
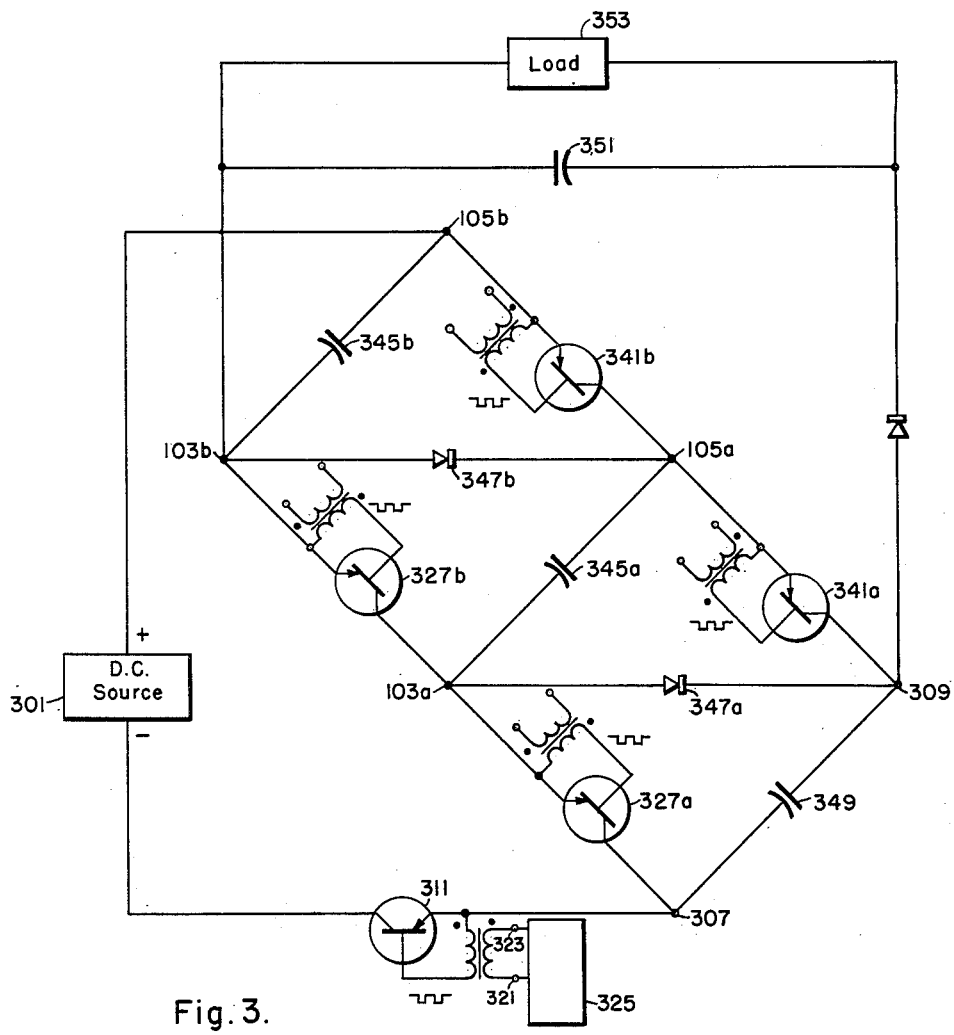
Fig. 3 is a diagrammatic showing of still another embodiment of my invention showing how various ratios of input voltage to output voltage may be achieved.

The embodiment shown in Fig. 3 illustrates the manner of connection when it is desired to obtain a ratio difference from 1:2 or 2:1, in this case the transformation ratio is 1:3. As in Fig. 2, reference numerals wherein the last two digits are the same designate identical component parts. In this embodiment an additional capacitor 345b is provided which is connected in parallel with capacitors 349 and 345a by means of transistor switches 341b and 327b which are actuated in synchronism with switches 341a and 327a. The latter switches 341a and 327a connect capacitors 345a and 349 in parallel. All of the condensers 349, 345a and 345b are preferably of the same capacitance. D. C. source 301 is connected to terminal 105b of capacitor 345b; the other terminal 103b of capacitor 345b is connected to terminal 105a of capacitor 345a by means of half-wave rectifier 347b while terminal 103a of capacitor 345a is connected to terminal 309 of capacitor 349 by means of half-wave rectifier 347a. The negative terminal of source 301 is connected to terminal 307 of capacitor 349 by means of transistor switch 311.

The operation of this embodiment is the same as that of Fig. 1, the capacitors 349, 345a and 345b being connected in series through rectifiers 347a and 347b on half-cycles of control voltage source 325 when switch 311 is closed and the other switches are open, and being discharged to load 353 when switch 311 is open and the other switches are closed. A voltage transformation of 1:3 is effected in this manner since the voltage across each of the capacitors is one-third that of the total voltage across the capacitors when they are in the series connection.

Manifestly, the addition of additional sections of capacitors and transistor switches will provide transformation ratios proportional to the number of sections added. Likewise, the connection of the source, load and half-wave rectifiers in the manner taught with reference to Fig. 2 will provide a step-up in voltage, the transformation ratio of which will be a direct function of the number of capacitors alternately connected in parallel and in series in the manner taught with reference to Fig. 3.

Figure 4:
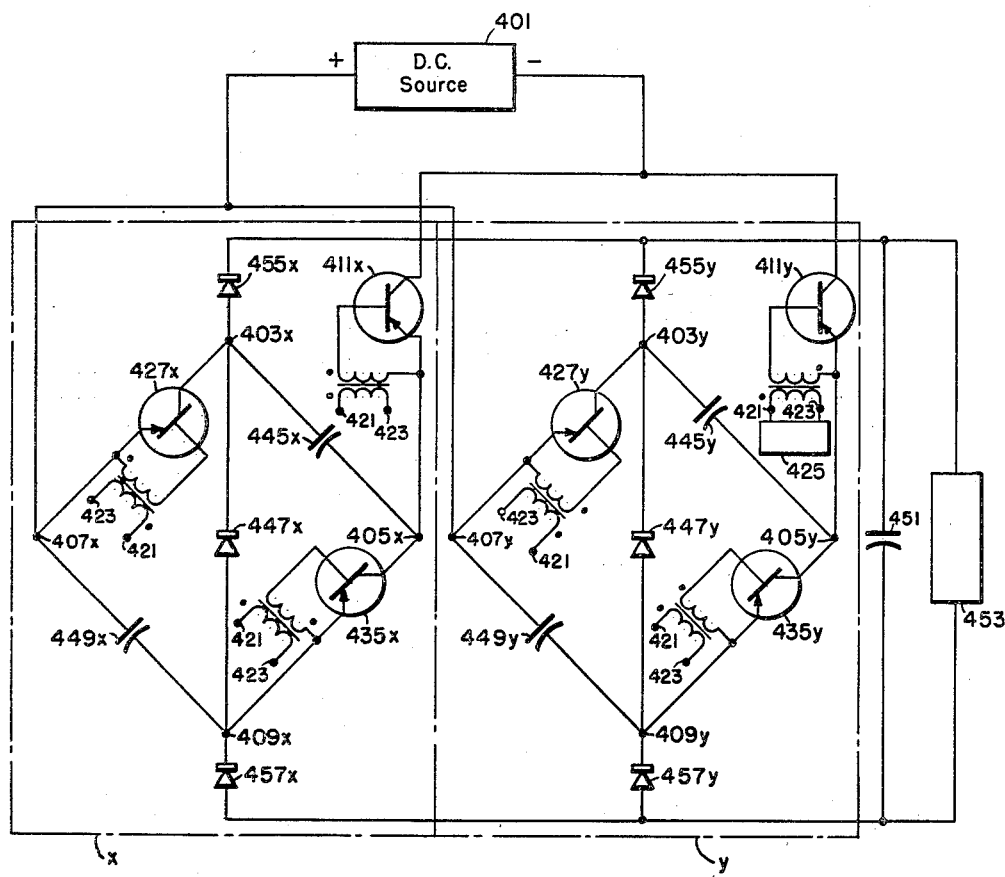
Fig. 4 is a diagrammatic showing of a push-pull embodiment of my invention useful in achieving minimum ripple voltage, surge currents and voltage drop.

The embodiment shown in Fig. 4 is useful where it is desired to reduce the magnitude of surge currents, as well as of ripple in the output voltage, and voltage drop between source and load to a very minimum. Reference numerals in Fig. 4, wherein the last two digits are the same as those of the reference numerals of Fig. 2, refer to identical circuit components.

The circuitry shown in each of the circuit blocks X and Y will be recognized as being essentially the same as that of Fig. 2 with the exception that the load terminals are coupled to the switching bridge circuit by means of additional half-wave rectifiers connected to the opposite side of the bridge circuit to that of the half-wave rectifier shown in Fig. 2. More specifically, terminals 403$x$ and 409$x$ of the circuitry shown in circuit block X are respectively coupled to opposite load terminals by means of rectifiers 455$x$ and 457$x$; terminals 403$y$ and 409$y$ of the circuitry of circuit block Y are coupled to opposite load terminals through half-wave rectifiers 455$y$ and 457$y$.

The input and output circuits of the circuit in block X and block Y are respectively connected in parallel between source and load so that the polarity of the output voltages therefrom across the load are of the same polarity. The control voltages applied between emitter and base of each of the transistor switches are phased so that capacitors 445$x$ and 449$x$ are charging while capacitors 445$y$ and 449$y$ of the circuitry of block Y are discharging, and vice versa. Thus, at all times, the load will be receiving current from one pair of capacitors or the other and the voltage across the load will be constant to a far greater extent than could possibly be achieved by utilizing the simpler circuitry shown in Figs. 1 and 3. This circuit may also be arranged to obtain voltage increase instead of voltage decrease as is the case with this particular circuit.

It has been found that the apparatus described above is capable of an overall efficiency greater than 95%. This compares with an efficiency of less than 85% generally obtained with D. C.-to-A. C. motor generator sets (and less than 50% for small units) and with an efficiency of from less than 70% obtained with the chopper-transformer-rectifier combination described above as being typical of the prior art. The apparatus is very light and occupies a relatively small amount of space, which advantages become increasingly important in aircraft installations, as has been noted.

The invention is not to be restricted to the specific structural details, arrangement of parts, or circuit connections herein set forth, as various modifications thereof may be effected without departing from the spirit and scope of this invention.

I claim as my invention:

1. Apparatus for transforming the output of a direct voltage source having a given terminal voltage to a second voltage across a load comprising: a plurality of capacitor means; first half-wave rectifier means connecting said capacitor means in series; a plurality of first transistor switch means each having emitter, base, and collector electrodes adapted to connect said capacitor means in parallel through the emitter-to-collector current conduction paths thereof; means coupling said capacitor means to said load and to said voltage source including second half-wave rectifier means and second transistor switch means having emitter, collector and base electrodes, the coupling action of said second transistor switch means being through the emitter-to-collector current conduction path thereof; means actuating said first and second transistor switch means in 180° phase relationship.

2. Apparatus for transforming the output of a direct voltage source having a given terminal voltage to a second voltage across a load comprising: a plurality of capacitor means; first half-wave rectifier means connecting said capacitor in series; a plurality of first transistor switch means each having emitter, base and collector electrodes adapted to connect said capacitors in parallel through the emitter-to-collector current conduction paths thereof; means coupling said capacitors to said load and to said voltage source including second half-wave rectifier means and second transistor switch means having emitter, collector, and base electrodes, the coupling action of said second transistor switch means being through the emitter-to-collector current conduction path thereof; base-to-emitter control voltage source means connected to each of said transistor means adapted to drive said transistor means alternately between collector current cutoff and collector current saturation, said first transistor means being driven between cut-off and saturation in 180 degree relationship with respect to said second means.

3. Apparatus for transforming the output of a direct voltage source having a given terminal voltage to a second voltage across a load comprising: a plurality of capacitor means; first half-way rectifier means electrically connecting said capacitor in series; a plurality of first transistor switch means each having emitter, base, and collector electrodes adapted to connect said capacitors in parallel through the emitter-to-collector current conduction paths thereof; means coupling said capacitors to said load and to said voltage source including second half-wave rectifier means and second transistor switch means having emitter, collector, and base electrodes, the coupling action of said second transistor switch means being through the emitter-to-collector current conduction path thereof; base-to-emitter control voltage source means connected to each of said transistor means adapted to drive said transistor means alternately between collector current cut-off and collector current saturation, said first transistor means being driven between cut-off and saturation in 180 degree relationship with respect to said second means.

4. Apparatus for transforming the output of a direct voltage source having a given terminal voltage to a second voltage across a load comprising: first and second sets of capacitor means; first half-wave rectifier means serially connecting the capacitors in each set of capacitor means; a plurality of first transistor switch means each having emitter, base and collector electrodes adapted to connect said first set of capacitor means in said set of capacitors in parallel through the emitter-to-collector current conduction path thereof; a plurality of second transistor switch means each having emitter, base and collector electrodes adapted to connect said second set of capacitor means in parallel through the emitter-to-collector current conduction path thereof; means connecting said first and second sets of capacitor means to said load and said source including third and fourth transistor switch means each having emitter, base and collector electrodes and respectively associated with said first and second sets of transistor and second half-wave rectifier means, the coupling action of said third and fourth transistor means being through the emitter-to-collector current conduction path thereof; means coupled to said base electrodes and an adjoining electrode of each of said transistor switch means actuating said transistor switch means so that one set of capacitor means is discharging to said load while the other set of capacitor means is being charged by said source, and vice versa.

5. Apparatus for transforming the output of a direct voltage source having a given terminal voltage to a second voltage across a load comprising: first and second sets of capacitor means; first half-wave rectifier means serially connecting the capacitors in each set of capacitor means; a plurality of first transistor switch means each having emitter, base and collector electrodes adapted to connect said first set of capacitor means in said set of capacitors in parallel through the emitter-to-collector current conduction path thereof; a plurality of second transistor switch means each having emitter, base and collector electrodes adapted to connect said second set of capacitor means in parallel through the emitter-to-collector current conduction path thereof; means connecting said first and second sets of capacitor means to said load and said source including third and fourth transistor switch means each having emitter, base and collector electrodes and respectively associated with said first and second sets of transistor and second half-wave rectifier means, the coupling action of said third and fourth transistor means being through the emitter-to-collector current conduction path thereof; means coupled to each of said base electrodes and an electrode adjoining thereto adapted to actuate said first and second transistor switch means in 180° relationship, and said third and fourth transistor means in 180° relationship.

References Cited in the file of this patent
UNITED STATES PATENTS

| 1,992,908 | Cockroft et al. | Feb. 26, 1935 |
| 2,462,804 | Canady | Feb. 22, 1949 |
| 2,652,502 | Melville et al. | Sept. 15, 1953 |